(12) United States Patent
Phares (10) Patent No.: US 11,735,704 B2
(45) Date of Patent: Aug. 22, 2023

(54) PREPARATION AND POWDER FILM DEPOSITION OF PRE-COATED POWDERS

(71) Applicant: Dragonfly Energy Corp., Reno, NV (US)

(72) Inventor: Denis Phares, Reno, NV (US)

(73) Assignee: Dragonfly Energy Corp., Reno, NV (US)

( * ) Notice: Subject to any disclaimer, the term of this patent is extended or adjusted under 35 U.S.C. 154(b) by 519 days.

(21) Appl. No.: 16/329,914

(22) PCT Filed: Feb. 14, 2018

(86) PCT No.: PCT/US2018/018138
§ 371 (c)(1),
(2) Date: Mar. 1, 2019

(87) PCT Pub. No.: WO2018/152173
PCT Pub. Date: Aug. 23, 2018

(65) Prior Publication Data
US 2019/0252668 A1 Aug. 15, 2019

Related U.S. Application Data

(60) Provisional application No. 62/458,945, filed on Feb. 14, 2017.

(51) Int. Cl.
*H01M 4/04* (2006.01)
*H01M 4/139* (2010.01)
(Continued)

(52) U.S. Cl.
CPC ....... *H01M 4/0404* (2013.01); *H01M 4/0419* (2013.01); *H01M 4/139* (2013.01);
(Continued)

(58) Field of Classification Search
CPC .. H01M 4/0404; H01M 4/0419; H01M 4/139; H01M 4/622
See application file for complete search history.

(56) References Cited

U.S. PATENT DOCUMENTS

| | | |
|---|---|---|
| 3,911,161 A | 10/1975 | Nord et al. |
| 3,935,340 A | 1/1976 | Yamaguchi et al. |

(Continued)

FOREIGN PATENT DOCUMENTS

| | | |
|---|---|---|
| CA | 2810123 C | 3/2012 |
| CN | 101075691 A | 11/2007 |

(Continued)

OTHER PUBLICATIONS

Aihara et al., Investigation on solvent-free solid polymer electrolytes for advanced lithium batteries and their performance. Journal of power sources. Feb. 25, 2003;114(1):96-104.

(Continued)

*Primary Examiner* — Jonathan G Jelsma
(74) *Attorney, Agent, or Firm* — Wolf, Greenfield & Sacks, P.C.

(57) ABSTRACT

Methods of forming encapsulated electrochemical and/or ionically conducting particles as their use in manufacturing electrochemical cells are described.

26 Claims, 5 Drawing Sheets

(51) Int. Cl.
*H01M 4/62* (2006.01)
*H01M 4/36* (2006.01)
*H01M 4/525* (2010.01)

(52) U.S. Cl.
CPC .......... *H01M 4/366* (2013.01); *H01M 4/525* (2013.01); *H01M 4/622* (2013.01); *H01M 4/623* (2013.01); *Y02P 20/54* (2015.11)

(56) References Cited

U.S. PATENT DOCUMENTS

| | | | |
|---|---|---|---|
| 5,106,650 | A | 4/1992 | Hoy et al. |
| 10,211,455 | B2 | 3/2019 | Pan et al. |
| 10,411,264 | B2 | 9/2019 | Pan et al. |
| 10,483,533 | B2 | 11/2019 | Zhamu et al. |
| 10,734,642 | B2 | 8/2020 | Zhamu et al. |
| 10,818,926 | B2 | 10/2020 | Pan et al. |
| 10,868,296 | B2 | 12/2020 | Lee et al. |
| 11,005,094 | B2 | 5/2021 | Pan et al. |
| 2003/0222017 | A1 | 12/2003 | Fulton et al. |
| 2004/0105980 | A1 | 6/2004 | Sudarshan et al. |
| 2004/0265504 | A1 | 12/2004 | Magnin et al. |
| 2006/0153972 | A1* | 7/2006 | Hirokawa ........... H01M 4/04 427/79 |
| 2011/0135836 | A1 | 6/2011 | Hays et al. |
| 2013/0011660 | A1 | 1/2013 | Diekmann et al. |
| 2013/0071741 | A1* | 3/2013 | Ohara ........... H01M 4/1393 29/623.5 |
| 2013/0273407 | A1 | 10/2013 | Kylyvnyk et al. |
| 2013/0309414 | A1 | 11/2013 | Eskra et al. |
| 2013/0323583 | A1 | 12/2013 | Phares |
| 2014/0227432 | A1 | 8/2014 | Liu et al. |
| 2014/0356705 | A1 | 12/2014 | Shaw |
| 2016/0013513 | A1* | 1/2016 | Gaben ........... H01M 4/366 429/159 |
| 2017/0022608 | A1* | 1/2017 | King ........... H01G 4/1227 |
| 2017/0062798 | A1* | 3/2017 | Wang ........... B05B 5/1683 |
| 2017/0288211 | A1 | 10/2017 | Zhamu et al. |
| 2017/0331100 | A1* | 11/2017 | Phares ........... H01M 4/13 |
| 2019/0115591 | A1 | 4/2019 | Zhamu et al. |
| 2019/0140254 | A1 | 5/2019 | Kim et al. |
| 2020/0067077 | A1 | 2/2020 | Pan et al. |
| 2021/0167354 | A1 | 6/2021 | Phares |

FOREIGN PATENT DOCUMENTS

| | | |
|---|---|---|
| CN | 101443109 A | 5/2009 |
| WO | WO 2015/042334 A2 | 3/2015 |

OTHER PUBLICATIONS

Seki et al., Effect of binder polymer structures used in composite cathodes on interfacial charge transfer processes in lithium polymer batteries. Electrochimica acta. Nov. 30, 2004;50(2-3):379-83.

International Search Report and Written Opinion for International Application No. PCT/US2018/018138, dated May 31, 2018.

Ludwig et al., Solvent-Free Manufacturing of Electrodes for Lithium-ion Batteries. Sci Rep. Mar. 17, 2016;6:23150, doi: 10.1038/srep23150.

U.S. Appl. No. 17/175,412, filed Feb. 12, 2021, Phares.

* cited by examiner

Fig. 1

```
Combine core particles, binder,
and super critical carbon
dioxide                              — 2
        ↓
Agitate mixture under heat
and/or pressure                      — 4
        ↓
Vent supercritical carbon
dioxide                              — 6
```

Fig. 2

```
Combine core particles,
monomer, polymerization
initiator, and solvent               — 8
        ↓
Agitate mixture under heat
and/or pressure (optional)           — 10
        ↓
Remove solvent                       — 12
```

Fig. 3

```
Combine core particles, binder,
and solvent                          — 14
        ↓
Agitate mixture under heat
and/or pressure                      — 16
        ↓
Aerosolize mixture                   — 18
        ↓
Evaporate solvent during
aerosolization                       — 20
```

PREPARATION AND POWDER FILM DEPOSITION OF PRE-COATED POWDERS

CROSS-REFERENCE TO RELATED APPLICATIONS

This application is a National Stage filing under 35 U.S.C. § 371 of international application serial number PCT/US2018/018138, filed on Feb. 14, 2018, which claims the benefit of priority under 35 U.S.C. § 119(e) of U.S. provisional application serial number 62/458,945, filed Feb. 14, 2017, the disclosures of each of which are incorporated by reference herein in their entirety.

FIELD

Disclosed embodiments are related to the preparation and powder film deposition of pre-coated powders.

BACKGROUND

Lithium ion batteries typically include two or more electrodes separated by an electrically insulating material that is permeable to the diffusion of Lithium ions between the electrodes. In some instances, one electrode includes an anode powder material coated onto a copper substrate and the other includes a cathode powder material coated onto an aluminum substrate. The production of these electrodes is conventionally done using slurry methods, in which the electrochemical material (e.g. the anode or cathode material) powders are mixed with a polymer binder (e.g. typically polyvinylidene fluoride PVDF) which is dissolved in an appropriate solvent (e.g. typically N-methyl pyrrolidone). The resulting slurry is coated onto the electrode substrate. Subsequently, the solvent is evaporated and reclaimed to form a dried layer of electrochemical material on the electrode surface. In order to remove all of the solvent from the electrodes prior to assembly into a battery, enormous amounts of time and energy are expended in the use of large conveyor ovens and vacuum dryers that help to dry the deposited slurry.

In view of the drawbacks to coating electrodes with slurries that are subsequently dried, different types of dry deposition methods have been developed. These methods include, for example, electrode extrusion as well as methods of electrostatically depositing particles that are mixed with a solvent and binder that are then aerosolized and deposited onto a substrate together.

SUMMARY

In one embodiment, a method includes: combining a plurality of core particles with a binder and super critical carbon dioxide to form a mixture, wherein the core particles comprise at least one of an electrochemical material and an ionically conductive material, and wherein the binder comprises a thermoplastic polymer; dissolving the binder in the super critical carbon dioxide; and removing the super critical carbon dioxide solvent to form coatings of the binder on the plurality of core particles that at least partially encapsulate the plurality of core particles.

In another embodiment, a method includes: combining a plurality of core particles with a monomer, a polymerization initiator, and a solvent to form a mixture, wherein the core particles comprise at least one of an electrochemical material and an ionically conductive material; and reacting the monomer and polymerization initiator to form thermoplastic polymer coatings on the plurality of core particles that at least partially encapsulate the plurality of core particles.

In yet another embodiment, a method includes: combining a plurality of core particles with a binder and a solvent to form a mixture, wherein the core particles comprise at least one of an electrochemical material and an ionically conductive material, and wherein the binder comprises a thermoplastic polymer; dissolving the binder in the solvent; and spraying the mixture, wherein the solvent evaporates while the mixture is being sprayed to form coatings of the binder on the plurality of core particles that at least partially encapsulate the plurality of core particles, wherein the separate encapsulated particles are not bonded to one another.

In another embodiment, a method includes: spraying a plurality of particles, wherein the plurality of particles include a plurality of core particles that are coated with a thermoplastic material that at least partially encapsulates the core particles, wherein the core particles comprise at least one of an electrochemical material and an ionically conductive material, and wherein the plurality of particles are substantially free from a solvent; applying a charge to the spray of particles; heating a substrate; and applying the charged spray of particles to the heated substrate to form a film of the particles on the substrate.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The Inventors have recognized that deposition methods where a separate particle and binder are combined and then deposited during a deposition process may lead to extra complexity and, in some instances, non-uniformity in the deposited materials. Thus, the Inventors have recognized that in some applications it may be desirable to decrease the complexity of a deposition process as well as increase the uniformity of the deposited materials. Accordingly, in some embodiments, a powder that is substantially free from a solvent may be deposited. In such an embodiment, the powder may correspond to a plurality of pre-coated particles including a plurality of core particles that are at least partially coated with a layer of binder that is substantially free from a solvent.

The use of a dry pre-coated powder where the individual particles are already coated or encapsulated with a binder may permit the use of deposition processes that do not include solvents. Therefore, depending on the particular deposition process being used, possible benefits associated with using a dry pre-coated powder may include, but are not necessarily limited to: eliminating the step of co-aerosolizing a separate binder material and/or solvent with a material to be deposited onto a substrate; a more uniform dispersion of the binder on the particle surfaces as well as throughout the resulting deposited film or layer; reduced complexity in the systems used to deposit the materials; as well as other possible benefits.

In view of the above, in one embodiment, a process for depositing a film or layer of a desired material onto a substrate may include the following. First, a plurality of particles may be sprayed without the use of a solvent and where the particles are pre-coated with a suitable binder such as a thermoplastic material. For example, in one embodiment, the particles may be aerosolized or otherwise turned into a spray of particles in any appropriate fashion. The binder may at least partially encapsulate one or more core particles to form a single particle or grain. The aerosolized particles may then be appropriately charged prior to being deposited onto a heated substrate to form the desired layer thereon. Thus, the pre-coated particles may be substantially free of an associated solvent, i.e. are not suspended in a solution or slurry including a solvent to dissolve the binder, prior to being aerosolized, during the spraying process, as well as after deposition.

Depending on the particular application, the core particles noted above may correspond to any appropriate electrochemical material and/or ionically conductive material as described further below. For example, an active layer of a particular electrode, such as an anode or cathode, may be formed by using core particles made from an appropriate electrochemical material. Alternatively, core particles made from an ionically conducting material may be used to form an electrically insulating layer such as a solid state separator. Of course instances where a combination of these different types of pre-coated core particles are co-sprayed, or co-aerosolized, with one another and are used to form a single deposited layer are also contemplated as the disclosure is not so limited.

In one embodiment, the described materials and processes may be used to form one or more components such as an anode, cathode, and/or separator of an electrochemical cell. Examples of electrochemical cells include, but are not limited to, batteries, super capacitors, and fuel cells. However, while the particular materials and processes described herein are primarily directed to electrochemical cells, and more specifically Li-ion based chemistries, it should be understood that the currently described methods and devices may be used to manufacture and deposit any appropriate type of core particle material coated with a binder, including different types of electrochemical cell chemistries, as the disclosure is not so limited.

To facilitate the manufacture of a solid state electrochemical cell, it may be desirable to sequentially deposit different types of pre-coated particles in separate layers that are disposed one on top of the other. For example, in one embodiment, pre-coated particles including core particles corresponding to a first electrochemical material may be deposited onto an electrode to form a first active layer corresponding to an anode or cathode of an electrochemical cell. Pre-coated particles including core particles corresponding to a first ionically conductive material may then be deposited onto the first active layer to form a separator. Pre-coated particles including core particles corresponding to a second electrochemical material may then be deposited onto the separator to form a second active layer corresponding to the other of the anode and cathode of the electrochemical cell. Alternatively, the other active layer may be deposited onto a separate electrode and assembled with the other layers through either a stacking or winding process. In some embodiments, a high pressure calendaring process may be used to help densify the various layers between depositions of the different layers. While any appropriate deposition method may be used for depositing the noted layers, in at least one embodiment, the powder deposition methods described herein may be used to deposit the desired layers.

As used herein, the terms coat, coating, encapsulate, encapsulation, as well as other similar terms, may refer generally to a coating of material applied to the surface of a core particle. Additionally, this coating of material may either fully coat the individual core particles and/or the coating may be applied to at least a portion of the core particles such that they are not fully coated or encapsulated. Additionally, a coating or encapsulation may either be applied to a single core particle, or multiple core particles may be coated or encapsulated within a single outer shell or coating. For example, multiple core particles, such as two or three core particles, may be encapsulated or coated such that they form a single larger particle. Therefore, it should be understood that a plurality of particles including coated core particles may correspond to embodiments where each particle is coated individually, instances where several particles are coated such that they form a larger combined particle, particles that are only partially encapsulated, particles that are fully encapsulated, as well as combinations of these types of particles.

As noted previously, the core particles used to form the pre-coated particles disclosed herein may include an electrochemical material and/or an ionically conducting material. Non-limiting examples of these types of materials are provided below.

Possible electrochemical materials include, but are not limited to, lithium cobalt oxide (LCO), lithium nickel manganese cobalt oxide (NMC), lithium manganese cobalt oxide (LMCO), lithium iron phosphate (LFP), lithium manganese iron phosphate (LMFP), lithium nickel cobalt aluminum oxide (NCA), lithium titanate (LTO), graphite, silicon, sulfur and/or combinations thereof. While particular types of electrochemical materials have been listed above it should be understood that any appropriate electrochemical material may be used as the disclosure is not limited to only these materials.

For the purposes of this disclosure, ionically conductive materials may include materials that facilitate the transport of ions both through the bulk of the material and/or the transport of ions along an interface between the material and a layer of binder material disposed on a particle surface. For example, $Li_2O$ core particles may transport Li ions through the bulk of the particles. In contrast, $TiO_2$ when combined with polyethylene oxide (PEO) may exhibit enhanced transport of Li ions when compared to either of these materials along which, without wishing to be bound by theory, may be due to an enhanced transport of Li ions along the interface between the $TiO_2$ particles and PEO binder. Of course, it is contemplated that certain core particle binder combinations may exhibit either one or both of these effects. However, in either case, these materials are still considered to be ionically conducting or ionically conductive materials for the purposes of this application.

In view of the above, possible ionically conducting materials may include one or more ionically conducting metal oxides, and/or metal oxides that facilitate the transport of ions along an interface with a binder, such as $Al_2O_3$, $SiO_2$, $TiO_2$, $MgO$, $ZnO$, $ZrO_2$, $CuO$, $CdO$, and $Li_2O$. Alternatively, and/or in combination with the noted metal oxides, the ionicially conducting material may be an ionically conducting glass such as one or more of $Li_2S$, $P_2S_5$, $xLi_2S$-$(1-x)P_2S_5$, and glass electrolytes formed from $Li_{(3-x)}H_{(x)}OCl$. While particular types of ionically conductive materials have been listed above it should be understood that any appropriate ionically conductive material may be used as the disclosure is not limited to only these materials.

Appropriate types of binders that may be used to form the pre-coated particles described herein, include, but are not limited to, any appropriate thermoplastic polymer. Additionally, it should be noted that the deposition of material layers without the use of a solvent using the pre-coated particles described herein may enable the use of binder materials that may improve properties of a resulting electrochemical cell, but that are not typically used in solvent based deposition processes. For example, binders that are more ionically and/or electronically conductive than typical binders, but that are not easily soluble in typical solvents, may be used to form the pre-coated particles. Accordingly, appropriate polymers include, but are not limited to polyvinylidene fluoride (PVDF), polytetrafluoroethylene (PTFE), styrene-butadiene (SBR), polyethylene oxide (PEO), polyacetylene, polyphenylene, polypyrrole, polythiophene, polyaniline, polyphenylene sulfide, and/or combinations of the above.

The core particles may have any appropriate size including micro and/or nanoparticles. For example, a core particle may have a maximum transverse dimension (e.g. maximum diameter) that is greater than or equal to 10 nm, 50 nm, 100 nm, 250 nm, 1 μm, 100 μm, or any other appropriate size. Similarly, the core particles may have a maximum transverse dimension that is less than or equal to 300 μm, 250 μm, 100 μm, 1 μm, 250 nm, or any other appropriate size. Combinations of the above ranges are contemplated including, for example, core particles with a maximum transverse dimension between or equal to 10 nm and 300 μm. Of course, core particles with dimensions both greater than and less than those noted above are also contemplated as the disclosure is not so limited.

The binder coatings formed on the core particles may have any appropriate average thickness to provide a desired conductivity in combination with the binder material properties. Additionally, pre-coated particles may have a coating layer that is sufficiently thin that the polymer layer is capable of melting or flowing into the voids or pores between the particles such that the individual particles are placed in electrical contact with one another. Accordingly, a pre-coated particle may have an average coating thickness that is greater than or equal to 3 nm and 10 nm, 50 nm, 100 nm, and 500 nm, or any other appropriate size. Correspondingly, the pre-coated particles may have an average coating thickness that is less than or equal to 1 μm, 500 nm, 100 nm, 50 nm, or any other appropriate size. Combinations of the above ranges are contemplated including, for example, coatings with an average thickness between or equal to 3 nm and 1 μm, 10 nm and 500 nm, or 10 nm and 100 nm. Of course, coatings with an average thickness both greater than and less than those noted above are also contemplated as the disclosure is not so limited.

Regarding the above, an average thickness of a coating may be taken as the average thickness of the coating across the entire surface of a particle. This includes regions of a particle that are uncoated, where the uncoated regions of a particle's surface would have a thickness of zero.

As noted previously, the binder coating thickness and binder material may be selected to provide a desired ionic conductivity. Accordingly, the binder coatings formed on the core particles may have an average ionic conductivity that is greater than or equal to $10^{-6}$ S/cm, $10^{-5}$ S/cm, $10^{-4}$ S/cm, or any other appropriate conductivity. Similarly, the binder coatings formed on the core particles may have an average ionic conductivity that is less than or equal to $10^{-2}$ S/cm, $10^{-3}$ S/cm, $10^{-4}$ S/cm, or any other appropriate conductivity. Combinations of the above ranges are contemplated including, for example, binder coatings on the core particles may have an average ionic conductivity between or equal to $10^{-6}$ S/cm and $10^{-2}$ S/cm. Of course, coatings with average conductivities both greater than and less than those noted above are also contemplated as the disclosure is not so limited.

Depending on the particular binder being used, it may be desirable to increase the ionic conductivity of the binder material being used. Accordingly, in some embodiments an ionically conductive salt may be dissolved in the binder forming the coatings on a pre-coated particle to improve the ionic conductivity. In one such embodiment, a lithium salt may be dissolved in the thermoplastic material of a binder. In such an embodiment, the thermoplastic binder materials may correspond to any of the polymers noted herein and may include a lithium salt dissolved therein. Appropriate lithium salts include, but are not limited to, $LiClO_4$, $LiBF_4$, $LiPF_6$, $LiAsF_6$, LiTf, LiTFSI, LiBETI, LiCTFSI, LiBOB, LiTDI, LiPDI, LiDCTA, and $LiB(CN)_4$. In one specific embodiment, a lithium salt may be dissolved in PEO to form PEO-LiX. Of course, other types of salts as well as the inclusion of non-lithium based salts may be used depending on the particular chemistry of an electrochemical cell the binder is being used with.

Turning now to the figures, several non-limiting embodiments are described in more detail. However, the various components, features, and methods described herein may be used in any appropriate combination as the disclosure is not so limited. Additionally, having described several applications for pre-coated particles, various ways of manufacturing the disclosed pre-coated particles are described further below, though it should be understood that these pre-coated particles may be used in any appropriate deposition method including, for example, a calendaring process, extrusion, green part production, as well as any other appropriate type of manufacturing process as the disclosure is not limited in this fashion.

Figure 1:
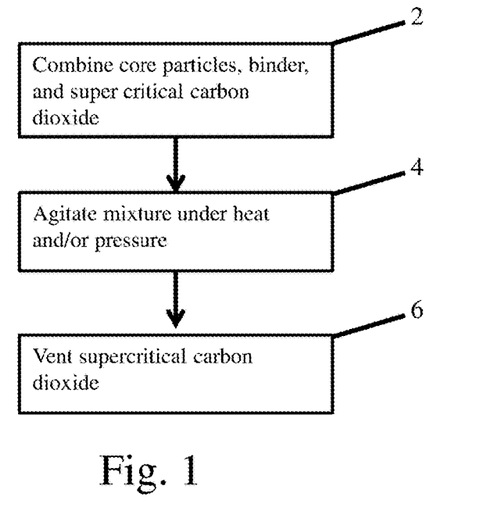
FIG. 1 is a flow diagram of one embodiment of a method for encapsulating a plurality of core particles using supercritical carbon dioxide.

FIG. 1 depicts one embodiment of a method for forming a plurality of pre-coated particles. In step 2, a plurality of core particles are combined with a thermoplastic polymer binder and super critical carbon dioxide to form a mixture. The mixture may be agitated or mixed under elevated temperature and/or pressure at 4 using any appropriate mechanism as described further below. This mixing process may be continued for an appropriate amount of time sufficient to permit the binder to dissolve within the supercritical carbon dioxide. Once the binder is dissolved and uniformly dispersed, the supercritical carbon dioxide may be vented at 6, e.g. the pressure may be released permitting the supercritical carbon dioxide to vaporize. As the supercritical carbon dioxide vaporizes, the uniformly dispersed binder precipitates onto, and forms coatings on, the surfaces of the core particles. The coatings may at least partially encapsulate the core particles. Due to the use of super critical carbon dioxide, the resulting pre-coated particles may be substantially free from solvents after the super critical carbon dioxide vaporizes.

Figure 2:
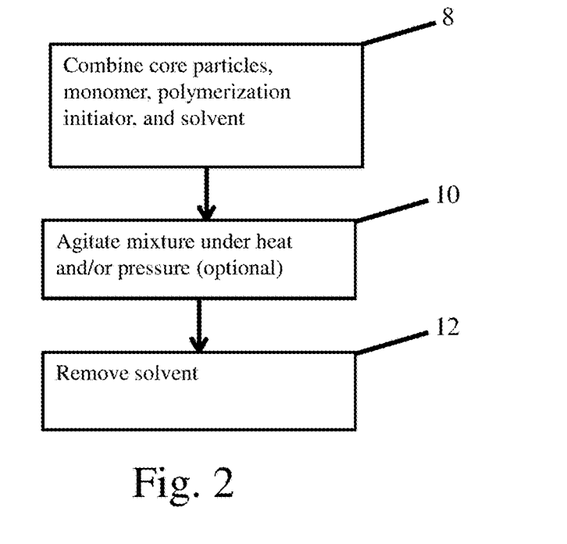
FIG. 2 is a flow diagram of one embodiment of a method for encapsulating a plurality of core particles using insitu polymerization.

FIG. 2 depicts another embodiment of a method for forming a plurality of pre-coated particles. In step 8, a plurality of core particles are combined with one or more types of monomers, a polymerization initiator, and a solvent. The mixture may be agitated or mixed under elevated temperature and/or pressure at 10 using any appropriate mechanism as described further below. This mixing process may be continued for an appropriate amount of time sufficient to permit the in-situ polymerization reaction to occur. Specifically, the monomer precursors and polymerization initiator react with one another to form thermoplastic polymer binder molecules that grow on the surfaces of the core. Additionally, by controlling the heat, pressure, reaction duration, monomer concentration, initiator concentration, and/or concentration of the core particles in the mixture it may be possible to control an average thickness of the polymer layer coatings grown on the core particles.

After the desired duration, the solvent, and optionally any remaining unreacted monomer, may be removed from the mixture at 12 leaving pre-coated particles that are substantially free from the solvent. For example, since the monomer is still dissolved in the solvent, the solvents removal may also remove the remaining portion of monomer. This effect may be enhanced through the use of solvents such as super critical carbon dioxide that enhance the transport of materials dissolved in it. Therefore, in such an embodiment, the super critical carbon dioxide may be siphoned off, or otherwise removed, to leave the remaining pre-coated particles. Alternatively, the amount of monomer present in the reaction may be limited to an amount appropriate for forming coatings with a desired thickness on the core particles. The reaction may then be allowed to proceed substantially to completion leaving the mixture substantially free of unreacted monomer. However, embodiments in which unreacted monomer is present within a reactor chamber along with the coated particles after removal of an associated solvent are also contemplated as the disclosure is not so limited.

In the above noted in situ polymerization process, any appropriate solvent compatible with the desired polymerization reaction may be used. For example, appropriate solvents include, but are not limited to, super critical carbon dioxide, N-methyl pyrrolidone (NMP), acetone, dimethylformamide (DMF), dimethyl sulfoxide (DMSO), and trimethyl phosphate. However, the use of supercritical carbon dioxide may offer several benefits. For example, in such an embodiment, the supercritical carbon dioxide may be removed from the system by simply venting a chamber the mixture is contained in which may facilitate the production of a dry coated powder that is substantially free of solvent.

Figure 3:
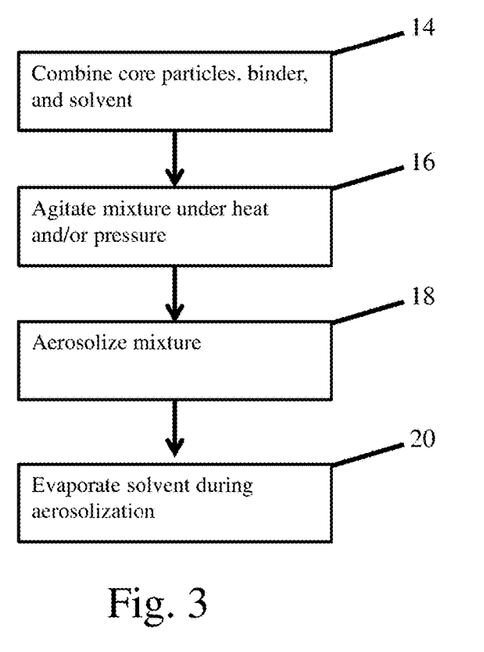
FIG. 3 is a flow diagram of one embodiment of a method encapsulating a plurality of core particles using aerosolization.

In yet another embodiment, a plurality of pre-coated particles may be formed using a spray process as shown in FIG. 3. In step 14, a plurality of core particles are combined with a thermoplastic polymer binder and a solvent to form a mixture. The mixture may be agitated or mixed under elevated temperature and/or pressure at 16 using any appropriate mechanism as described further below. This mixing process may be continued for an appropriate amount of time sufficient to permit the binder to dissolve within the solvent. Once the binder is dissolved and uniformly dispersed, the mixture may be aerosolized, or otherwise sprayed, using, for example, a spray gun, at 18. While in the aerosolized form, the solvent may evaporate from the individual aerosolized core particles, while the binder residue remains on the surface of the particle cores. This binder residue may form coatings on the surfaces of the core particles that at least partially encapsulate the core particles and are substantially free from solvents. Although a solvent is still used in this embodiment, aerosol drying of the powder is far more effective and inexpensive then drying of the powder film after it has been deposited as a particle film. Additionally, evaporating the solvent during the aersolization process also produces coatings that are substantially free from the solvent.

In the above noted aerosolization process, any appropriate solvent capable of dissolving the binder may be used. For example, appropriate solvents include, but are not limited to, super critical carbon dioxide, N-methyl pyrrolidone (NMP), acetone, dimethylformamide (DMF), dimethyl sulfoxide (DMSO), and trimethyl phosphate. In embodiments where supercritical carbon dioxide is used as the solvent, the supercritical carbon dioxide may vaporize when the mixture is sprayed or otherwise aerosolized which may help further ensure the resulting pre-coated particles are substantially free from solvents.

In the above noted embodiments where super critical carbon dioxide is used, any appropriate combination of temperature and/or pressure within a high pressure reaction chamber may be used. For example, the pressure may be between the critical pressure (1071 psi or 7.39 MPa) and 4000 psi (27.6 MPa), 1200 psi (8.3 MPa) and 3000 psi (20.7 MPa), 1200 psi (8.3 MPa) and 2000 psi (13.8 MPa), or any other appropriate range of pressures as the disclosure is not so limited. Additionally, the temperature may be between the critical temperature (31.1° C.) and a decomposition and/or degradation temperature of a thermoplastic binder material that forms a coating on the particles. For example, depending on the particular binder being used, a processing temperature for use with super critical carbon dioxide may be between or equal to 31.1° C. and 300° C., 40° C. and 100° C., 40° C. and 80° C., or any other appropriate range of temperatures as the disclosure is not so limited. Additionally, while specific ranges of temperature and pressures have been noted for use with super critical carbon dioxide, it should be noted that different ranges of temperatures and pressures that are greater than and/or less than those noted above are also contemplated.

Figure 4:
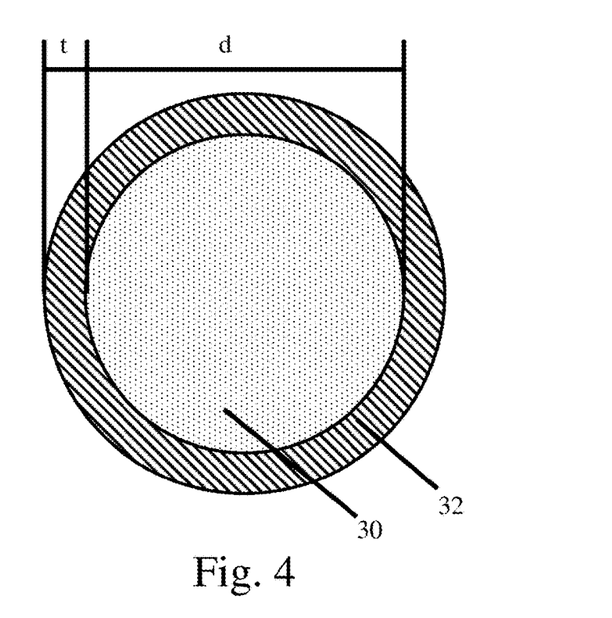
FIG. 4 is a schematic representation of one embodiment of an encapsulated core particle.

FIG. 4 shows one embodiment of a pre-coated particle. In the depicted embodiment, a core particle 30 has an outer maximum transverse dimension d, such as a diameter for a round particle. The core particle is coated with a layer of binder material 32 with an average thickness t. The average thickness may correspond to the thickness of the coating deposited on the surface of the particle including regions where the core particle surface is bare and would correspond to a thickness of zero. Additionally, while the depicted particle is a sphere, it should be under stood that other particle geometries, including irregular and or elongated particle geometries may be used for a core particle. For example, core particles with flake geometries, such as potato flake graphite, might be used. Accordingly, a core particle, and resulting pre-coated particle, should not be limited to any particle size and/or shape.

Figure 5A:
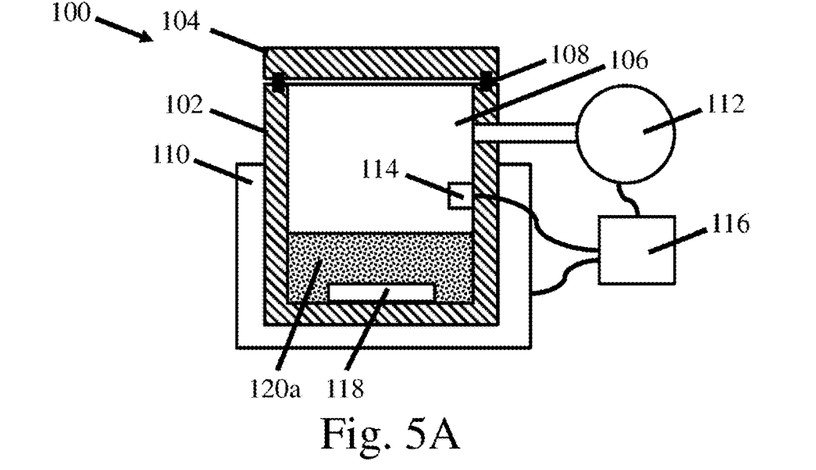
FIG. 5A is a schematic representation of one embodiment of a system encapsulating a plurality of core particles.
Figure 5B:
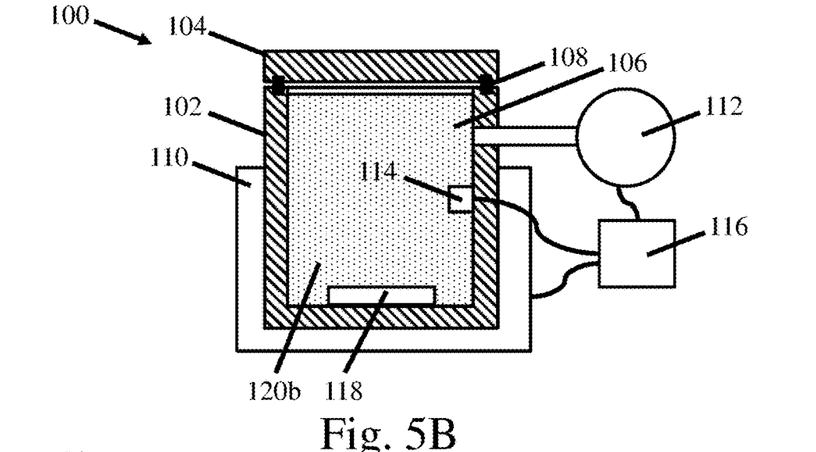
FIG. 5B is the system of FIG. 5A including a mixture of core particles and a solvent.
Figure 5C:
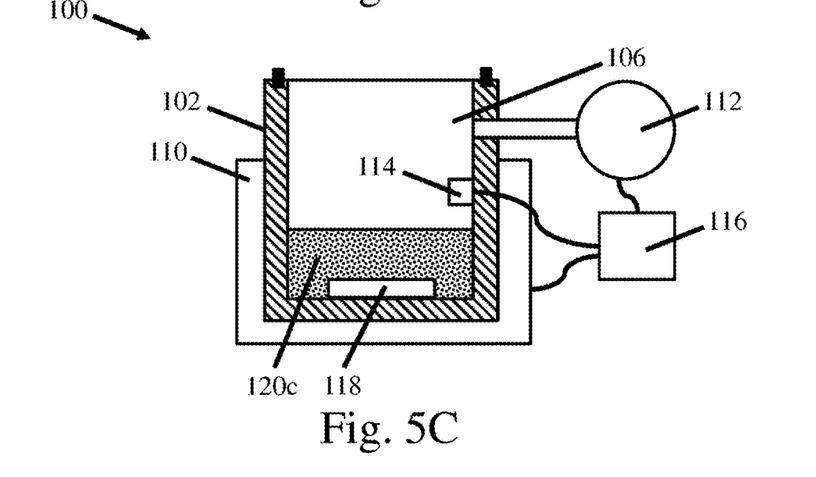
FIG. 5C is the system of FIG. 5B after they solvent has been removed leaving the encapsulated core particles.

FIGS. 5A-5C illustrate one embodiment of a reactor 100 that may be used for making pre-coated particles using the methods described herein. In the depicted embodiment, the reactor includes a lower portion 102 configured to contain solids and/or liquids therein and a lid 104 that is selectively attachable to the lower portion to define an inner chamber 106. A seal 108 may be located between the lower portion and lid to provide a high pressure seal for the inner chamber. The seal and reactor may be configured to handle both the temperatures and pressures described herein with respect to the different processing methods.

To control a temperature of a reactor 100, a heater 110, such as a heater well the reactor is disposed inside of, may be used to control the temperature of the reactor. However, other ways of heating a reactor may be used including, for example, heating tape, a heated environment such as an oven, or any other appropriate way of heating the reactor. The reactor may also include a solvent source 112 that is in selective fluid communication with the inner chamber 106 to dispense solvent into the inner chamber. In instances where a high pressure solvent is used, such as super critical carbon dioxide, the solvent source may either correspond to a pressurized source and/or the solvent source may include a pressurization device, such as a pump, to pressurize the solvent and/or the reactor inner chamber to a desired pressure.

In order to facilitate the dissolving and/or dispersion of materials within a reactor, it may be desirable to mix the materials contained within a reactor. Accordingly, a reactor 100 may include a mixer 118 within the inner chamber 106. For example, a magnetic mixing bar may be disposed within the inner chamber, and an externally located magnetic stirrer, not depicted, may be used to mix the materials contained in the reactor inner chamber. Alternatively, the reactor chamber may be physically agitated using a shaker or any other appropriate device may be used to agitate and/or mix the contents within the reactor.

In some embodiments, it may be desirable to control the processing conditions within a reactor 100. Accordingly, a reactor may include one or more pressure detectors, temperature detectors, or other appropriate type of detector 114 that is capable of sensing a processing parameter within the inner chamber 106. These sensors may either be disposed within the chamber to make direct measurements and/or they may be disposed outside of the inner chamber such that they make indirect measurements of the processing parameters as the disclosure is not so limited. These one or more detectors may be in electrical communication with a controller 116 that is in electrical communication with the solvent source 112 and/or heater 118. Thus, based on the one or more detected processing parameters the controller may: control a heat output and/or temperature of the heater to provide a desired processing temperature; control a pressure and/or amount of solvent within the reactor; and/or any other appropriate processing parameter as the disclosure is not so limited.

For the sake of clarity, the use of the disclosed reactor described below is done relative to a process using a mixture of a binder, core particles, and a solvent such as super critical carbon dioxide. However, it should be understood that such a reactor may be used to perform an insitu-polymerization reaction as well by using a combination of one or more monomer precursors, a polymerization initiator, solvent, and core particles instead.

Initially, a plurality of core particles 120a are placed into the inner chamber 106 of a reactor 100, see FIG. 5A. A mixture 120b may then be formed in the reactor in FIG. 5B by mixing the core particles with a solvent and a binder that are placed into the chamber. The binder may be placed in the chamber by simply providing a desired amount of the binder in powder form, or any other appropriate form, into the chamber. The lid 104 may then be sealed onto the lower portion 106 of the chamber. The controller 106 may then control the solvent source, which may be pressurized, to dispense a desired amount solvent into the inner chamber and/or control a pressure within the reactor. For example, super critical carbon dioxide may be dispensed into the chamber. Alternatively, in the instance where typical solvents are used, the solvent may simply be poured into the inner chamber. The controller may also control the heater 110 to heat the chamber to a desired processing temperature. The controller may then maintain the processing parameters within the chamber using detected processing parameter signals from the one or more detectors 114.

To help aid in dissolving and/or dispersing the materials within a mixture 120b, a mixer 118 is operated to mix the materials contained within an inner chamber 106 of the reactor 100. The processing parameters and mixing of the materials contained within the reactor may be continued until the binder is dissolved by the solvent and uniformly dispersed within the mixture 120b. Subsequently, the solvent may be removed from the reactor. For example, in the case of super critical carbon dioxide, the reactor may simply be vented by depressurizing the inner chamber causing the super critical carbon dioxide to vaporize causing the dissolved binder material to precipitate out of the mixture and form coatings on the surfaces of the plurality of core particles. This leaves a plurality of pre-coated particles 120c within the reactor. Alternatively, the inner chamber may be in fluid communication with a spray gun, aerosolizing nozzle, or other appropriate feature (not depicted) that would aerosolize the mixture permitting the solvent to evaporate or vaporize while the mixture is in the aerosolized form to create the desired pre-coated particles. The pre-coated particles may then be separately collected and deposited onto a substrate.

Figure 6:
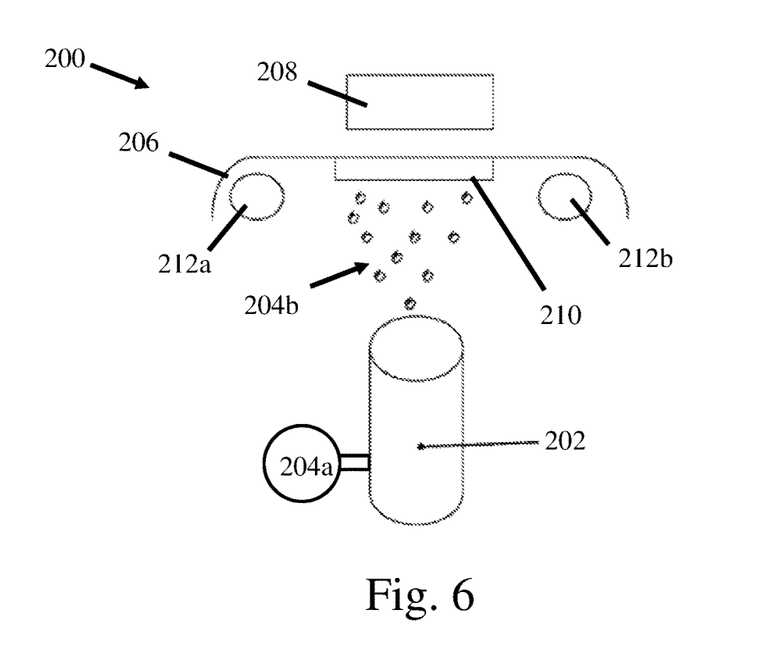
FIG. 6 is a schematic representation of one embodiment of a spray deposition system used to deposit a powder including a plurality of pre-coated particles.

FIG. 6 depicts one embodiment of a possible deposition method and apparatus that may be used with the disclosed pre-coated particles. Specifically, the disclosed method and apparatus are used to perform a powder coating process such as an electrostatic powder coating process. In the depicted embodiment, a deposition system 200 includes a spray gun 202 or any other appropriate device capable of aerosolizing and appropriately charging a powder for a powder coating process. For example, in the depicted embodiment, a material container 204A is connected, and feeds material, to the spray gun. However, unlike prior systems, the material container does not contain a slurry of material including a solvent to help dissolve and disperse a binder along with a desired type of active material. Instead, the material container may contain a dry powder corresponding to a plurality of the pre-coated particles that are substantially free from solvent as discussed herein. This dry powder may be feed into the spray gun in any appropriate manner. However, in one embodiment, the material container may correspond to a fluidized bed, a venture atomizer, a Wright dust feeder, or other appropriate device that is capable of aerosolizing and/or otherwise transporting the dry powder to the spray gun.

Once aerosolized, or otherwise transported to a dispensing point, the dry powder is sprayed out from the spray gun 202. Alternatively, in instances where the dry powder is supplied to the spray gun without being aerosolized, the spray gun may aerosolize the dry powder during the spraying process. In either case, a charge may be applied to the pre-coated particles as they are sprayed out from the spray gun. In two possible embodiments, this charging process may be done using a corona gun that applies a charge to the particles or by friction caused by the flow of the particles through a Teflon tube associated with the spray gun. In either case, the charged and aerosolized spray 205B may be emitted from the spray gun towards an opposing substrate 206, such as a metallic electrode, an active layer on top of an electrode, or any other appropriate type of substrate.

While a stationary substrate may be used, in the depicted embodiment, a pair of rollers 212a and 212b are used in a reel to reel system, not depicted, where the substrate is unwound from a first reel from the first roller 212a where it is subsequently passed to the second roller 212b and then wound onto a second reel to provide a continuous production process where the moving substrate travels through a deposition area where the charged aerosolized spray 205b is deposited onto the substrate.

To facilitate the attraction and retention of a charged aerosolized spray 205b onto a substrate 206, the substrate may be grounded. Further, the substrate may be grounded in any appropriate manner including, for example: a ground connection through the rollers a substrate is in contact with; conductive contacts, such as one or more conductive brushes, in contact with the moving substrate; or any other appropriate arrangement. Once properly grounded, the charged and aerosolized spray 204 may be attracted towards, and deposited onto, the substrate to form a deposited layer 210 thereon. They thickness of the deposited layer may be controlled by the deposition rate of material emitted from the spray gun, a speed of the substrate, and/or other appropriate control parameters.

As the layer 210 is deposited onto the substrate 206, a heater 208 may apply heat to the substrate either at, and/or adjacent to, the location where the sprayed on material is deposited. The applied heat may cause the binder coatings on the individual deposited particles in layer 210 to melt permitting the binder on the pre-coated particles to flow and bind to both the substrate as well as adjacent particles forming a coherent layer that is bonded to the substrate. Flow of the binder may also at least partially densify the deposited material layer. However, in some instances additional calendaring rollers, not depicted, may be used to apply pressure to the deposited layer to further densify the deposited material.

It should be understood that the depicted heater may transfer heat to the substrate, and associated deposited layer, in any appropriate manner including convective heat transfer, conductive heat transfer, and/or radiative heat transfer. For example, appropriate types of heaters include, but are not limited to: a radiative heater; a heated surface such as a smooth heated glass or roller surface the substrate passes over; a heated oven or other environment the substrate passes through; hot air blowers; or any other appropriate device capable of transferring heat to the substrate.

As mentioned previously above, depending on what type of material is sprayed on to a substrate to form a deposited layer, different types of structures may be formed using the above described process. For example, pre-coated particles including electrochemical materials as their cores may be deposited onto an electrode to form the active layers of an anode and/or cathode of an electrochemical cell. Similarly, if an ionically conducting material is used for the core particles, the material may be deposited onto an active layer of an anode and/or cathode to form an ionically conducting separator layer. Of course, while several possible embodiments are described above, it should be understood that the presently disclosed materials and processes should not be limited to just these types of applications and structures.

When heating certain substrates, such as thin metal foils, these substrates may have relatively small specific heats. Therefore, these types of substrates may be susceptible to cooling, even when being heating, from a variety of sources including air convection experienced during a powder coating process. Accordingly, when a thin foil, or other thin substrate, is used as a target during a powder coating process, the substrate may exhibit large temperature gradients across its length which may result in non-uniform deposition. Additionally, in order to reliably heat material above the melting point of the binder within a deposition area, a substrate may need to be heated significantly above the binder melting point to prevent the substrate from locally cooling below this temperature. This cooling effect, and temperature non-uniformity, may be at least partially mitigated by having the heater located directly opposite the deposition area. However, this may be impractical to do in certain applications such as the double-sided coating process shown in FIG. 7 because the deposited layers may either acts as a thermal barrier for a subsequently deposited layer and/or one or more of the heaters may be located adjacent to a deposition area which may again result in a non-uniform temperature distribution.

In view of the above, in some embodiments, a substrate a material is deposited onto may be resistively heated during powder deposition by passing an electrical current (either AC or DC) through the substrate. Using this method, heat may be generated continuously and uniformly within the substrate itself. Without wishing to be bound by theory, this may result in a smaller temperature gradient across the substrate's length within a deposition area. Again this may result in a more uniform layer of material being deposited onto the substrate. Additionally, since the heat is generated within the substrate, instead of being transferred to it from an externally located heater, material may be easily applied to the substrate on two opposing sides at the same location where the heat is generated as discussed further below in regards to FIG. 7. However, embodiments in which a layer is deposited onto only one side of the substrate are also contemplated.

Figure 7:
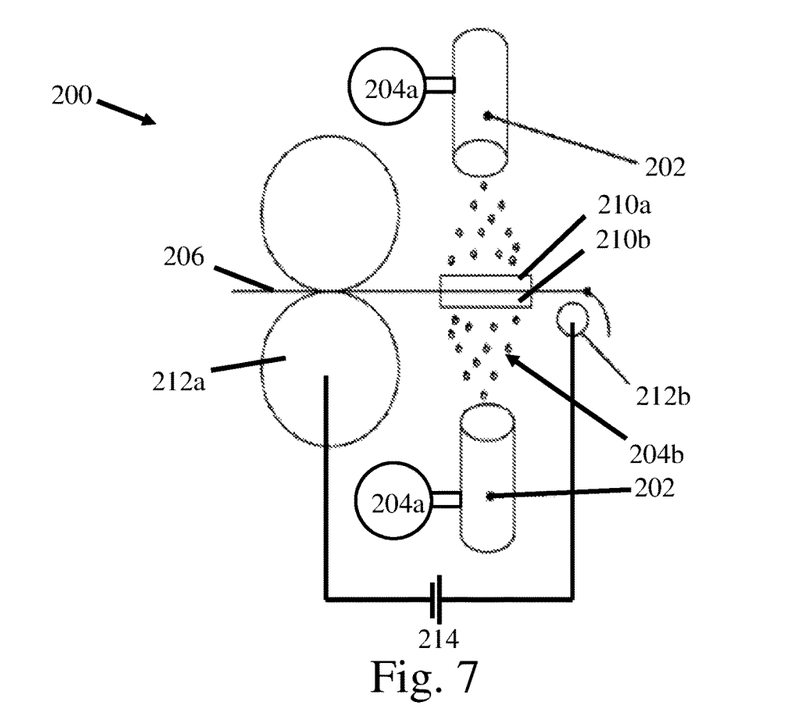
FIG. 7 is a schematic representation of one embodiment of a spray deposition system used to deposit a powder including a plurality of pre-coated particles.

Similar to the previously described embodiment, a deposition system 200, as shown in FIG. 7, may include one or more rollers 212a and 212b that feed the substrate from a first reel of substrate to a second reel that collects the substrate and deposited material, not depicted. The system may also include a material container 204A that is connected, and feeds material, to a spray gun 202 as previously described. However, as shown in the figure, in some embodiments, the system may include two spray guns and one or more associated material containers may connected to the spray guns. The spray guns may then direct charged and aerosolized sprays 205B onto the opposing sides of the substrate within a desired deposition area. This deposited material may form two opposing deposited layers 210a and 210b located on the opposing sides of the substrate.

To provide the desired heating of the substrate, two electrodes may be located on opposing sides of a deposition area where the layers 210a and 210b are deposited onto the substrate 206. These electrodes are then used to pass a current through the substrate to generate heat therein. In one embodiment, such as in the depicted continuous reel-to-reel coating system depicted in FIG. 7, the rollers 212a located on the pre-deposition (uncoated) side may serve as one electrode and the rollers 212b located on the post deposition side may be used as the other electrode. The rollers may include conductive brushes and/or bearings that are used to pass a current through the rollers and associated substrate. Additionally, in such an embodiment, the rollers, or other appropriate electrodes, are connected to a power source 214 that drives the current through the electrodes and associated substrate the electrodes are in electrical contact with.

When electrical contact is made through a deposited layer of material on a substrate, it should be noted that the uncompacted material layer may have high contact resistance. Accordingly, after being deposited, a substrate may be passed through a calendaring press to consolidate the material layer and reduce the contact resistance of the layer to facilitate making electrical contact with and passing a current through the substrate. In some embodiments, the calendaring rollers may be used as the second electrode with the contact resistance being reduced by the high pressure contact. Though embodiments in which a separate electrode is used are also contemplated.

While the above embodiment uses rollers as the electrodes that pass a current through a substrate, other electrode arrangements are also contemplated. For example, sliding contacts such as smooth conductive surfaces the substrate is moved over, conductive brushes, and/or any other appropriate type of electrode capable of conducting electrical current to or from a substrate may be used. Additionally, a system may use a combination of these different types of electrodes as the disclosure is not limited to any particular arrangement and/or type of electrode. In one such embodiment, a combination of a conductive brush and roller located on opposing sides of a deposition area may be used.

Example: Forming a Dry Pre-Coated Powder with Super Critical Carbon Dioxide

A Parr Instruments high pressure 1 L reactor was used for processing the materials. The reactor included a stainless steel chamber capable of withstanding pressures up to 3000 PSI and temperatures up to 300 C., and a controller that monitored the thermodynamic processing parameters (e.g. pressure and temperature) within the chamber. The chamber was enclosed in a heating well. The temperatures of the well and the chamber were monitored by thermocouples, and the pressure in the chamber was monitored by a transducer with a needle display on top of the chamber and a digital display on the controller. The reactor was also equipped with a magnetic mixer capable of a 900 RPM mixing velocity. In all of the tests presented here, $CO_2$ was pumped into the chamber to the desired pressure using an SSI Supercritical 24 dual piston pump. Supercritical-grade $CO_2$ (99.99% purity) was supplied by Praxair.

The chamber was initially filled with 25 g of LiCoO (LCO) cathode powder and 1.4 g of a polyvinylidene fluoride (PVDF) binder. The cathode and binder powders were mixed together, and the white binder powder was clearly visible among the black LCO grains. The chamber was then sealed, and carbon dioxide was then pumped into the sealed chamber and the heater was turned on, until the chamber temperature and pressure were 55 C. and 1505 PSI, respectively to form super critical carbon dioxide within the chamber. The mixer was set to 500 RPM, and the chamber was heated continuously for 2 hours until the temperature and pressure reached 90 C. and 2118 PSI—far into the super critical carbon dioxide regime.

When the desired peak temperature and pressure were reached, the chamber was immediately depressurized and cooled to vaporizing the super critical carbon dioxide contained within the chamber. The resulting powder no longer exhibited separate visible PVDF binder because the binder had formed coatings on the individual grains of LCO powder. Additionally, the color of the coated powder was a uniform grey which was lighter than the originally black LCO powder. Additionally, the physical behavior of the powder was different after coating. For example, there was a notable decrease in hygroscopicity, and the powder was far less prone to clumping than the original LCO powder. Both of these properties are beneficial for processes such as fluidization and aerosolization used in powder coating processes.

Figure 8:
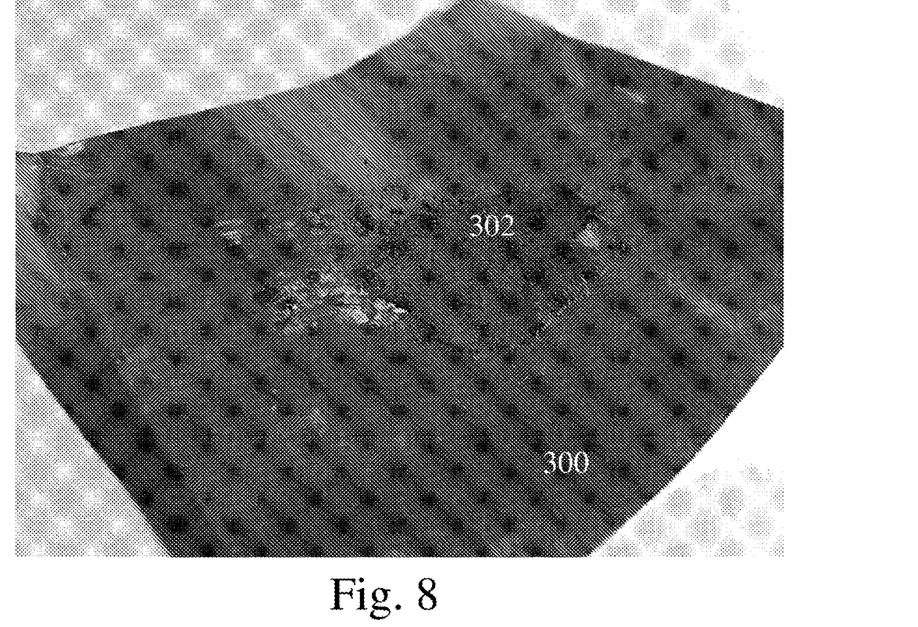
FIG. 8 is a photograph of encapsulated electrochemical powder spray coated onto an electrode substrate.

As shown in FIG. 8, a powder film was produced from the encapsulated LCO by manually dusting the powder onto a piece of aluminum foil 400. The powder was then manually pressed on a hot plate at a temperature of 130 C. The resulting powder film 402, though uncontrolled in thickness due to the manual deposition procedure, adhered strongly to the foil and was compliant enough to be able to withstand curvature in the foil. Without wishing to be bound by theory, this indicates that the PVDF binder was applied to substantially all of the grains permitting them to strongly bind to one another and the foil.

Example: Additional Processing Conditions with Super Critical Carbon Dioxide

After the initial test, additional processing conditions were explored. The chamber was filled with 26 g of LCO and 3 g of PEO. With the mixer set to 900 RPM, $CO_2$ was pumped into the chamber and the chamber was heated until the temperature and pressure inside the chamber reached 41 C. and 1429 PSI, respectively. The pump was stopped, and the heating was continued for 45 minutes. When the temperature and pressure reached 70 C. and 2264 PSI, respectively, the chamber was rapidly depressurized and cooled. Once again, the resulting powder looked grey, and exhibited the similar flow behavior as the previous coated powder. The coated powder was again manually placed onto a piece of foil and pressed on a hot plate. The resulting film also showed strong adhesion of the film to the foil demonstrating the benefits of encapsulating the electrode powder in binder prior to dry deposition.

Example: Additional Processing Conditions with Super Critical Carbon Dioxide

Figure 9:
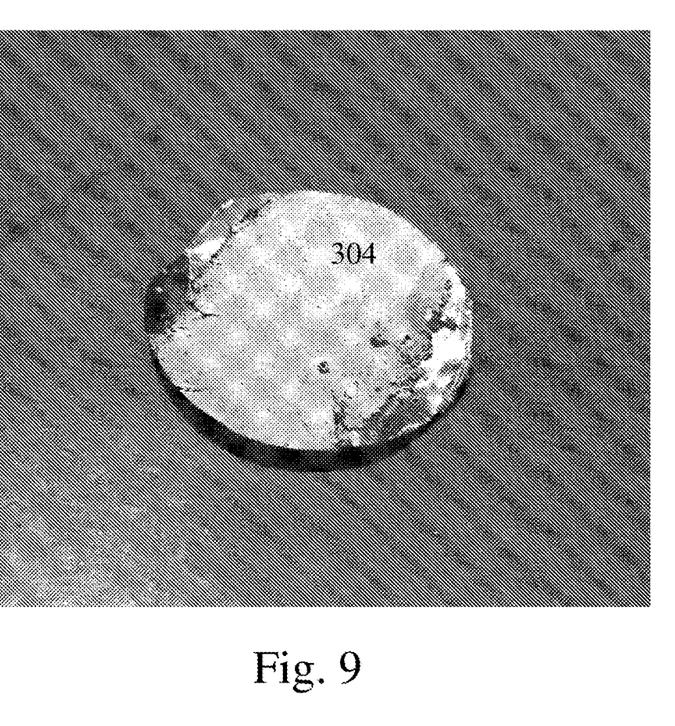
FIG. 9 is a photograph of encapsulated ionically conductive powder spray coated onto an active layer substrate.

Since the films produced in the prior examples could theoretically be used in a completely solid-state Li ion battery cell, materials for depositing an ion-conducting separator film on top of the electrochemical active film were produced using an ion conductive metal oxide. Specifically, the same reactor chamber was filled with 10 g of $TiO_2$ and 6 g of PEO. Similar to the previous examples, the pressure and temperature were increased to levels above the supercritical transition of $CO_2$. In this case, the peak temperature and pressure were 70 C. and 1497 PSI respectively. At this point the chamber was rapidly depressurized and cooled. Encapsulation was not as obvious in this case, since PEO and $TiO_2$ are both white. However, the successful encapsulation became obvious when the manual film deposition procedure described in the previous examples resulted in a compliant film that adhered to Aluminum foil. The $TiO_2$/PEO sample was also manually deposited on top of the previously described LCO/PEO film, essentially producing the cathode and ion conductor for a solid-state Li-ion battery. The resulting multi-layered film is shown in FIG. 9.

Example: Pre-Coated Particle Characterization

Figure 10:
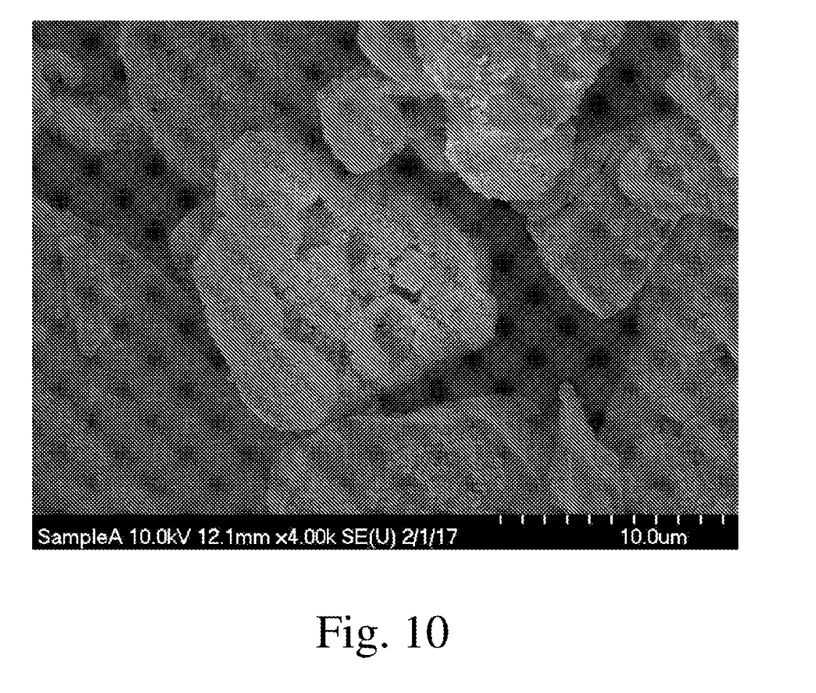
FIG. 10 is a scanning electron micrograph of a Lithium Cobalt Oxide core particle that is completely encapsulated in PVDF.
Figure 11:
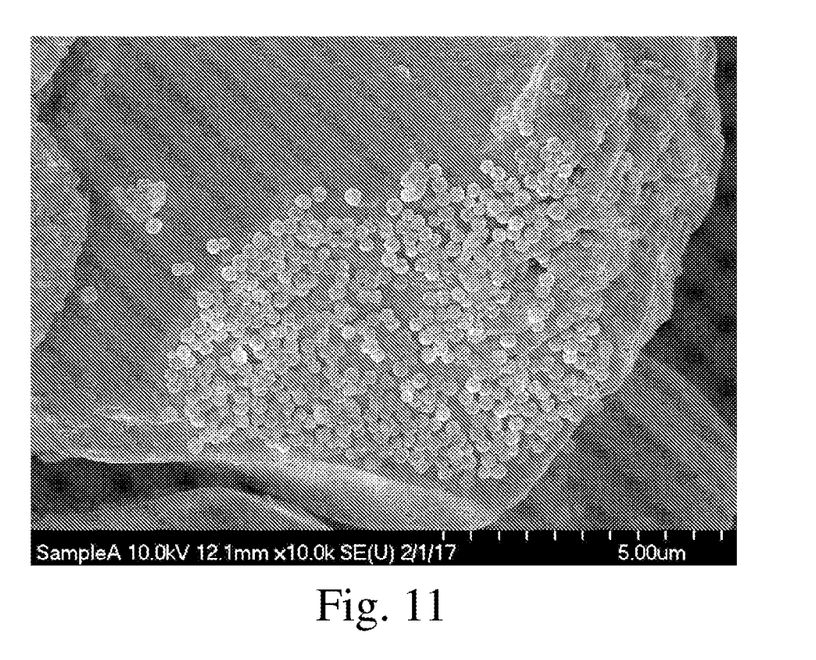
FIG. 11 is a scanning electron micrograph of a Lithium Cobalt Oxide core particle that is partially encapsulated in PVDF.

PVDF was used to encapsulate LCO core particles using the super critical carbon dioxide encapsulation process detailed above. FIGS. 10 and 11 are scanning electron micrographs that visually characterize the morphology of fully encapsulated and partially encapsulated core particles respectively. In these images, the PVDF is present as submicron particles. Energy Dispersive Spectroscopy (EDS) was used to identify a fluorine signature associated with the submicron particles confirming they were PVDF. Without wishing to be bound by theory, the figures confirm that upon evacuation of the super critical carbon dioxide from the pressure vessel, the PVDF recrystallizes as submicron particles on the surface of the core particles.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method comprising:
spraying a plurality of particles, wherein the plurality of particles includes a plurality of core particles that are coated with a binder that at least partially encapsulates the core particles, wherein the binder comprises a thermoplastic material, wherein the core particles comprise at least one selected from the group of an electrochemical material and an ionically conductive material, and wherein the plurality of particles are substantially free from a solvent;
applying a charge to the spray of particles;
heating a substrate; and
applying the charged spray of particles to the heated substrate to form a film of the particles on the substrate, wherein the heat applied to the substrate causes the binder coated on the core particles to melt and bind to the substrate and/or adjacent coated particles of the plurality of particles.

2. The method of claim 1, where heating the substrate comprises at least one selected from the group of radiating, convecting, and conducting heat to the substrate.

3. The method of claim 1, where heating the substrate comprises passing an electrical current through the substrate.

4. The method of claim 1, wherein the core particles comprise the electrochemical material, and the substrate is an electrode.

5. The method of claim 1, wherein the electrochemical material comprises at least one selected from the group of lithium cobalt oxide, lithium nickel manganese cobalt oxide, lithium manganese cobalt oxide, lithium iron phosphate, lithium manganese iron phosphate, lithium nickel cobalt aluminum oxide, lithium titanate, and graphite.

6. The method of claim 1, wherein the core particles comprise the ionically conductive material, and the substrate comprises an anode or cathode of an electrochemical cell.

7. The method of claim 6, wherein the ionically conductive material comprises at least one selected from the group of an ionically conductive metal oxide and an ionically conductive glass.

8. The method of claim 7, wherein the core particles comprise at least one selected from the group of $Al_2O_3$, $SiO_2$, $TiO_2$, MgO, ZnO, $ZrO_2$, CuO, CdO, and $Li_2O$.

9. The method of claim 7, wherein the core particles comprise at least one selected from the group of $Li_2S$, $P_2S_5$, $xLi_2S$—$(1-x)P_2S_5$, and glass electrolytes comprising $Li_{(3-x)}H_{(x)}OCl$.

10. The method of claim 1, wherein spraying the plurality of particles includes aerosolizing the plurality of particles.

11. The method of claim 1, wherein a maximum transverse dimension of the plurality of core particles is between or equal to 10 nm and 300 μm.

12. The method of claim 1, wherein an average coating thickness of the thermoplastic material is between or equal to 3 nm and 1 μm.

13. The method of claim 12, wherein the average coating thickness is between 3 nm and 100 nm.

14. The method of claim 1, wherein the thermoplastic material has an average ionic conductivity that is between or equal to $10^{-6}$ S/cm and $10^{-2}$ S/cm.

15. The method of claim 1, wherein the thermoplastic material comprises at least one selected from the group of polyvinylidene fluoride, polytetrafluoroethylene, styrene-butadiene, polyethylene oxide, polyacetylene, polyphenylene, polypyrrole, polythiophene, polyaniline, and polyphenylene sulfide.

16. The method of claim 1, wherein the coating of thermoplastic material is a layer of thermoplastic material disposed on and extending at least partially around one or more of the plurality of core particles.

17. The method of claim 1, wherein each particle of the plurality of particles includes one or more of the plurality of core particles encapsulated with the thermoplastic material.

18. The method of claim 1, wherein the plurality of particles that includes the plurality of core particles coated with a thermoplastic material is contained within a single material container, and wherein spraying the plurality of particles comprises spraying the plurality of particles from the single material container.

19. The method of claim 1, wherein the plurality of core particles has a maximum transverse dimension of between or equal to 10 nm and 300 μm.

20. The method of claim 19, wherein the plurality of core particles are coated with a thermoplastic material having a coating thickness of between or equal to 3 nm and 1 μm.

21. The method of claim 1, further comprising flowing the thermoplastic material such that individual particles of the plurality of particles are placed in electrical contact with one another.

22. The method of claim 1, wherein substantially all of the core particles are coated with the binder.

23. The method of claim 1, wherein the plurality of coated particles is not suspended in a solvent prior to spraying.

24. A method comprising:
spraying a plurality of particles, wherein the plurality of particles includes ionically conductive particles coated with a binder that at least partially encapsulates the ionically conductive particles, wherein the binder comprises a thermoplastic material;
applying a charge to the spray of particles;
heating a substrate; and
applying the charged spray of particles to the heated substrate to form a film of the plurality of particles on the substrate, wherein the heat applied to the substrate causes the binder coated on the ionically conductive particles to melt and bind to the substrate and/or adjacent coated particles of the plurality of particles.

25. The method of claim 24, wherein the binder comprises a lithium salt dispersed within the binder.

26. A method comprising:
spraying a plurality of electrochemical and/or ionically conductive particles, wherein the plurality of particles are coated with a binder that at least partially encapsulates the particles, wherein the binder comprises a thermoplastic material;
applying a charge to the spray of particles;
heating a substrate; and
applying the charged spray of particles to the heated substrate to form a film of the particles on the substrate, wherein the heat applied to the substrate causes the binder coated on the particles to melt and bind to the substrate and/or adjacent coated particles of the plurality of particles, wherein the plurality of coated particles is not suspended in a solvent prior to the spraying.

* * * * *